Aug. 1, 1961     H. B. McMULLIN     2,994,117

OPENING CLOSURE MEANS

Filed Jan. 31, 1958

INVENTOR.
Harold Breniman McMullin
BY
M. Talbert Dick
ATTORNEY.

Witness.
A. S. Martin.

United States Patent Office 2,994,117
Patented Aug. 1, 1961

2,994,117
OPENING CLOSURE MEANS
Harold Breniman McMullin, Brooklyn, Iowa
Filed Jan. 31, 1958, Ser. No. 712,453
1 Claim. (Cl. 24—201)

This invention relates to an opening closure means of the "zipper" type, and more particularly to a closing means that when in closed condition is water tight and airtight.

One of the most universal means for closing openings is the mechanical "zipper" fastener. Such means, however, has many shortcomings. First, the "zipper" fastener is not uniformly flexible in all lateral directions, nor is it flexible or resilient lognitudinally. Secondly, it is a loose closing means in that it is not liquid, dust, or gas proof. Also, inasmuch as it is of metal, it is relatively heavy.

Some effort has been made to provide an opening closing means of plastic. The troubles with such means are that it is rather stiff, and lateral bending in almost any direction will accidentally open it. Furthermore, the plastic groove and plastic tongue rapidly lose their resiliency, and the means fails as an effective closing means. Also, modern times require fasteners for purposes which cannot be served by the ordinary "zipper" type fasteners. High altitude and outer space clothing require that the openings be sealed. This is also true of clothing that must protect the user against atomic radiation, active dust, and like contaminating particles and gases.

Therefore, one of the principal objects of my invention is to provide an opening fastener that will hermetically seal the opening against liquids, gases, and particles.

A further object of this invention is to provide an opening fastening means that is resilient and flexible in all directions.

A still further object of this invention is to provide an opening fastener that is relatively light weight.

A still further object of my invention is to provide a resilient fastener for openings that maintains its resiliency.

A still further object of this invention is to provide an opening fastener that is easily and quickly actuated.

Still further objects of my invention are to provide an opening fastener that will not rust, is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claim, and illustrated in the accompanying drawings, in which:

Figure 1:
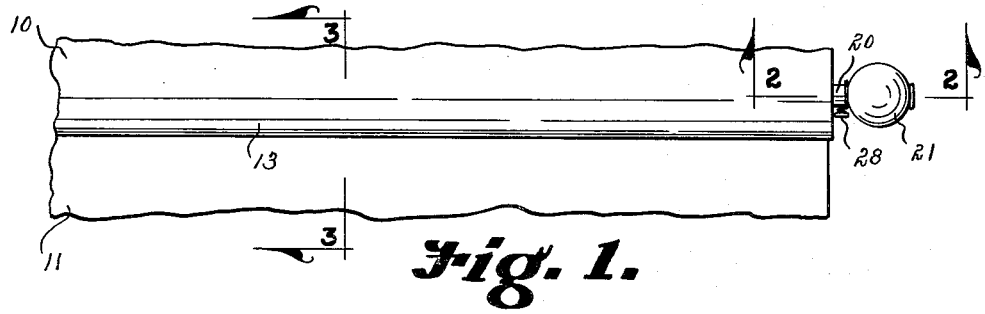
FIG. 1 is a plan view of my opening closing means.
Figure 3:
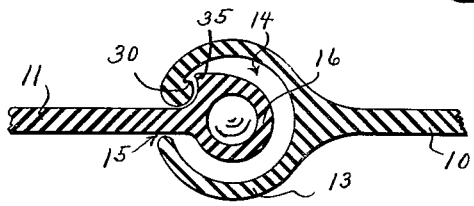
FIG. 3 is an enlarged cross sectional view of the device taken on line 3—3 of FIG. 1 and shows the male part deflated.
Figure 4:
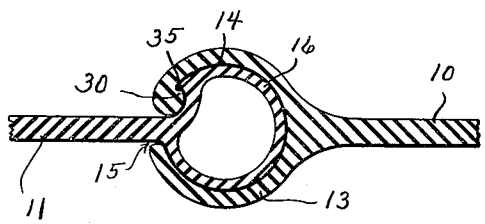
FIG. 4 is an enlarged cross sectional view of my opening closing means with the male part inflated.
Figure 2:
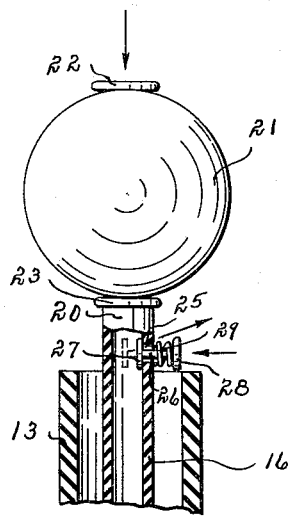
FIG. 2 is an enlarged sectional view of the device taken on line 2—2 of FIG. 1 and more fully illustrates its construction.

In the drawings I have used the numerals 10 and 11 to designate opposite sheet members that when separated produce an opening between them. To one of these members I secure or form onto it the elongated female portion 13. This portion 13, when viewed in cross section as shown in FIG. 3, has an elongated bore 14 and an elongated mouth opening 15 communicating with the inside length of the bore 14 and the outside atmosphere. This bore 14 is circular in cross section and is of a diameter substantially greater than that of the width of the mouth or slot opening 15. The numeral 16 designates the male portion and which is secured to or formed with the other sheet member 11. This elongated portion 16 has its free elongated marginal edge area in the form of a flexible resilient tubular hose, circular in cross section, as shown in FIG. 4. The diameter of this tubular hose portion is much greater than that of the thickness where it joins the sheet member. Both the part 13 and part 16 is preferably made of flexible resilient material such as rubber or like. In any event the hose or tubular portion of the part 16 must be impervious and expandable. The tubular hose portion when not expanded is capable of being resiliently compressed so as to be placed through the mouth slot 15 of the part 13 and into the bore 14 of the part 13. In the drawings both the parts 13 and 16 are shown as resilient and the placement of the part 16 in the part 13 is easy. However, if the part 13 is rigid, the mouth opening 15 should be enlarged from that shown. Obviously, if the tubular hose portion is in the bore 14 and the tubular hose portion is inflated, it will expand in the bore 14 to such a size in diameter that it cannot be withdrawn through the mouth slot opening 15 and from the part 13. Any suitable means, including a mouth tube, may be used to inflate and thereby expand the tubular hose. In the drawings I close one end of the tubular hose, and extend the other end to form a neck portion 20. On the other and free end of the neck 20, I secure an ordinary manually actuated rubber bulb 21 having the usual one-way air entrance valve 22, and the usual one-way air exit valve 23 at the entrance end of the neck 20, as shown in FIG. 1. By this arrangement, by manually intermittently squeezing the air pump bulb 21, air will be forced into and held in the tubular hose of the part 16, thereby swelling the tubular hose inside the female part 13, thus preventing the removal of the part 16 from the part 13.

To remove the part 16 from the part 13, it is necessary to deflate the tubular hose of the part 16. To accomplish this air pressure release I have an air escape hole passageway 25 through the wall of the neck 20. Through this hole I extend a shaft 26. This shaft has a valve head 27 on its inner end and inside the neck 20. The numeral 28 designates a button on the outer end of the shaft. The numeral 29 designates a coil spring embracing the shaft 26 having one end engaging the outer side of the neck 20 and its other end engaging the button 28. This spring holds the valve head in closing position over the passageway 25. To release the air pressure in the tubular hose, it is merely necessary to manually depress the button 28 and expose the air passageway 25 to permit the air pressure to escape therethrough. With the deflating of the tubular hose it may be easily withdrawn from the part 13 through its mouth slot. When the parts 13 and 16 are together and the tubular hose is inflated, the entire bore of the part 13 will be closely contacted by the flexible resilient tubular hose, thereby hermetically sealing the parts 13 and 16 together. If desired, precharged gas pressure cartridges may be used to inflate the tubular hose of the part 16. To facilitate the yielding retention of the tubular hose of the part 16 in the bore of the part 13 until the hose can be inflated, I have formed a hook flange 30 on the wall of the bore of the part 13 adjacent the mouth slot opening and a co-acting hook flange 35 on the side of the tubular hose of the part 16. By these two hook flanges in engagement with each other, the two parts 13 and 16 will be yieldingly temporarily held together until the hose can be inflated.

If the device need not flex in any direction, the part 13 may be made of rigid material such as hard plastic, metal or like.

Some changes may be made in the construction and arrangement of my opening closure means without departing from the real spirit and purpose of my invention and it is my intention to cover by my claim, any modified

I claim:

In an opening closing means, a first sheet member, a female member on said first sheet member, at one side of an opening and having a longitudinal open groove bore, a second sheet member, a male member on said second sheet member at the other side of the opening and having an elongated inflatable flexible resilient tube detachably resting in said open groove bore of said female member; a means for furnishing a flowable matter into said inflatable tube, a manually releasable valve communicating with the inside of said inflatable tube, a hook flange on the outer rear side of said tube extending in a direction toward said second sheet member, and a hook flange on the inner side of said groove bore, extending in a direction toward said first sheet member and capable of hook engaging the hook flange of said tube.

References Cited in the file of this patent

UNITED STATES PATENTS

| | | |
|---|---|---|
| 2,144,755 | Freedman | Jan. 24, 1939 |
| 2,460,853 | Siple | Feb. 8, 1949 |
| 2,569,451 | Browne | Oct. 2, 1951 |
| 2,715,759 | Poux | Aug. 23, 1955 |